(12) United States Patent
Iizuka et al.

(10) Patent No.: US 8,394,876 B2
(45) Date of Patent: *Mar. 12, 2013

(54) GOLF BALL

(75) Inventors: Kae Iizuka, Saitamaken (JP); Eiji Takehana, Saitamaken (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 68 days.

This patent is subject to a terminal disclaimer.

(21) Appl. No.: 12/886,045

(22) Filed: Sep. 20, 2010

(65) Prior Publication Data

US 2012/0071272 A1 Mar. 22, 2012

(51) Int. Cl.
*A63B 37/12* (2006.01)
*A63B 37/00* (2006.01)
*C08L 33/02* (2006.01)

(52) U.S. Cl. ........ 524/322; 524/399; 524/400; 525/195; 525/196; 525/201; 525/221; 473/373; 473/374

(58) Field of Classification Search .................... None
See application file for complete search history.

(56) References Cited

U.S. PATENT DOCUMENTS

| | | | |
|---|---|---|---|
| 5,873,796 A | 2/1999 | Cavallaro et al. | |
| 6,267,693 B1 | 7/2001 | Sullivan | |
| 7,273,903 B2 | 9/2007 | Chen | |
| 7,462,113 B2 | 12/2008 | Kim et al. | |
| 8,008,392 B1 * | 8/2011 | Iizuka et al. | 524/522 |
| 2001/0011046 A1 * | 8/2001 | Ichikawa et al. | 473/371 |
| 2001/0020068 A1 * | 9/2001 | Sullivan | 525/196 |
| 2006/0106145 A1 * | 5/2006 | Kennedy et al. | 524/322 |
| 2009/0264220 A1 * | 10/2009 | Shindo et al. | 473/376 |
| 2011/0118398 A1 * | 5/2011 | Iizuka et al. | 524/322 |

* cited by examiner

*Primary Examiner* — David Buttner
(74) *Attorney, Agent, or Firm* — Sughrue Mion, PLLC

(57) ABSTRACT

The invention provides a golf ball in which an intermediate layer formed of a highly neutralized resin mixture obtained by using two nonionic resins of differing weight-average molecular weights and breadths of molecular weight distribution (weight-average molecular weight/number-average molecular weight) as the base resin and adding thereto an organic acid or a metal salt thereof and a basic inorganic metal compound capable of being neutralized is combined with a cover formed of an ionic resin having a weight-average molecular weight in a specific range and a breadth of molecular weight distribution (weight-average molecular weight/number-average molecular weight) in a specific range. The golf ball material of the invention has an excellent rebound and durability.

9 Claims, No Drawings

GOLF BALL

BACKGROUND OF THE INVENTION

The present invention relates to a golf ball composed of a core, one or more intermediate layer encasing the core, and an outermost cover layer.

Ionic resins, or ionomers, are conventionally used in golf balls. In particular, using an ionic resin having a high acid content is effective when the aim is to increase the rebound or lower the spin rate of the ball. Art that seeks to increase the rebound or lower the spin rate of the ball by highly neutralizing the ionic resin has also been disclosed. For example, methods that involve blending ionomers together, methods in which other thermoplastic resins or additives are blended together with an ionomer, and methods that increase the degree of neutralization of an ionomer itself have been proposed.

Among methods that involve blending ionomers together, a number of techniques which use in combination two ionomers of different weight-average molecular weights have been proposed. For example, U.S. Pat. No. 7,462,113 discloses the use in a cover material of a ternary ionomer having a weight-average molecular weight of from 80,000 to 500,000 in combination with a ternary ionomer having a weight-average molecular weight of from 2,000 to 30,000. Also, U.S. Pat. No. 7,273,903 describes a cover material obtained by blending together a ternary ionomer having a weight-average molecular weight of from 80,000 to 500,000, a binary ionomer having a weight-average molecular weight of from 2,000 to 30,000, and an optional thermoplastic elastomer.

Golf ball materials which use ionomers and blends wherein the content of unsaturated carboxylic acid (sometimes abbreviated below as "acid content") falls in a specific range have also been disclosed. For example, U.S. Pat. No. 6,267,693 describes an ionomer blend having an acid content of from 18.5 to 21.5%, and U.S. Pat. No. 5,873,796 describes a blend of an ionomer having an acid content of 19% with an ionomer having an acid content of 15%. Also, U.S. Pat. No. 5,222,733 describes a golf ball composition wherein at least 30% of the composition is an ionomer having an acid content of from 20 to 30%.

However, when an ionic resin having a high acid content is highly neutralized, the durability declines. For this reason, such ionic resins are not actively used in golf balls. Also, ionic resins with a high acid content often have too low a melt index (MI), making them difficult to injection mold and sometimes resulting in a poor workability in the manufacture of golf balls.

By improving the materials that form each part of the golf ball in this way, improvements have been made in ball properties such as the rebound and durability. However, there remains room for further improvement. Moreover, when an ionic resin is used in the outer cover layer of a golf ball, this has had the drawback of worsening the scuff resistance of the ball.

SUMMARY OF THE INVENTION

It is therefore an object of the present invention to provide a golf ball which has a high rebound, an excellent spin rate-lowering effect and an excellent durability.

As a result of extensive investigations, the inventors have discovered that, in a golf ball having a core, one or more intermediate layer, and an outermost cover layer, by forming at least one intermediate layer of a material obtained by blending a nonionic polymer having a high acid content with a nonionic polymer having a low or moderate acid content and neutralizing the acid content in a specific range, and by forming the cover of a material containing an ionic polymer having a high acid content and/or an ionic polymer having a low or moderate acid content, there can be obtained a golf ball having an even higher rebound and an even lower spin rate, and having also an even excellent durability.

Accordingly, the present invention provides the following golf ball.

[1] A golf ball comprising a core, one or more intermediate layer and an outermost cover layer, wherein at least one intermediate layer is formed of a resin composition which is comprised of:

(a) a nonionic olefin-unsaturated carboxylic acid copolymer and/or olefin-unsaturated carboxylic acid-unsaturated carboxylic acid ester copolymer having a weight-average molecular weight (Mw) of from 40,000 to 200,000, a weight-average molecular weight (Mw)/number-average molecular weight (Mn) ratio of from 2.0 to 10.0 and an unsaturated carboxylic acid content of at least 16 wt %, (b) a nonionic olefin-unsaturated carboxylic acid copolymer and/or olefin-unsaturated carboxylic acid-unsaturated carboxylic acid ester copolymer having a weight-average molecular weight (Mw) of from 40,000 to 200,000, a weight-average molecular weight (Mw)/number-average molecular weight (Mn) ratio of from 4.0 to 10.0 and an unsaturated carboxylic acid content of less than 16 wt %, (c) an organic acid or a metal salt thereof, and (d) a basic inorganic metal compound for neutralizing at least 70 mol % of acid groups in components (a) to (c), and which has a material hardness, expressed as the Shore D hardness, of from 40 to 60; and wherein the cover is formed of a resin composition which is comprised of:

(A) an ionic olefin-unsaturated carboxylic acid copolymer and/or olefin-unsaturated carboxylic acid-unsaturated carboxylic acid ester copolymer having a weight-average molecular weight (Mw) of from 40,000 to 200,000, a weight-average molecular weight (Mw)/number-average molecular weight (Mn) ratio of from 4.0 to 10.0 and an unsaturated carboxylic acid content of at least 16 wt %, and/or (B) an ionic olefin-unsaturated carboxylic acid copolymer and/or olefin-unsaturated carboxylic acid-unsaturated carboxylic acid ester copolymer having a weight-average molecular weight (Mw) of from 40,000 to 200,000, a weight-average molecular weight (Mw)/number-average molecular weight (Mn) of from 4.0 to 10.0 and an unsaturated carboxylic acid content of less than 16 wt %, and which has a material hardness, expressed as the Shore D hardness, of at least 55.

[2] The golf ball of [1], wherein components (a) and (b) have a mixing ratio by weight (a):(b) therebetween of from 20:80 to 80:20, component (c) is included in an amount of from 30 to 80 parts by weight per 100 parts by weight of components (a) and (b) combined, and components (A) and (B) have a mixing ratio by weight (A):(B) therebetween of from 20:80 to 80:20.

[3] The golf ball of [1], wherein (c) is stearic acid or a metal salt thereof.

[4] The golf ball of [1], wherein the unsaturated carboxylic acid included in components (a), (b), (A) and (B) is acrylic acid or methacrylic acid.

DETAILED DESCRIPTION OF THE INVENTION

The invention is described more fully below.

The golf ball of the invention has a core, one or more intermediate layer and an outermost cover layer. At least one intermediate layer is formed of a material obtained by blending a nonionic polymer having a high acid content with a nonionic polymer having a low or moderate acid content, and neutralizing the acid content in a specific range. The cover is formed of a material containing an ionic polymer having a high acid content and/or an ionic polymer having a low or moderate acid content.

First of all, the core may be formed using a rubber composition containing, for example, a known base rubber and also such ingredients as a co-crosslinking agent, an organic peroxide, an inert filler, sulfur and an organosulfur compound. Here, it is preferable to use polybutadiene as the base rubber.

The following ingredients may be suitably blended into the base rubber: a co-crosslinking agent such as an unsaturated carboxylic acid and a metal salt thereof; an inert filler such as zinc oxide, barium sulfate and calcium carbonate; an organosulfur compound such as the zinc salt of pentachlorothiophenol; and an organic peroxide such as dicumyl peroxide and 1,1-bis(t-butylperoxy)cyclohexane. If necessary, other ingredients such as a commercial antioxidant may be suitably added as well.

The core-forming rubber composition which includes the above ingredients is prepared by mastication using a conventional mixing apparatus such as a Banbury mixer or a roll mill. Alternatively, when the core is molded using such a rubber composition, molding may be carried out by compression molding or injection molding using a given core mold. The molded body obtained is hot cured under temperature conditions sufficient for the crosslinking agent and co-crosslinking agent included in the rubber composition to act, thereby giving a core having a given hardness profile. Although the vulcanization conditions are not subject to any particular limitation, when dicumyl peroxide is used as the crosslinking agent and zinc acrylate is used as the co-crosslinking agent, the conditions are generally set to about 100 to 200° C., especially 150 to 180° C., and to 10 to 40 minutes, especially 12 to 20 minutes.

The diameter of the core obtained by the above method of production, although not subject to any particular limitation, may be set to preferably at least 25.0 mm, more preferably at least 30.0 mm, and even more preferably at least 35.0 mm. The upper limit in the diameter, although not subject to any particular limitation, is preferably 40.0 mm or less, and more preferably 39.5 mm or less.

The core structure is not limited to one layer, and may be a multi-layer structure of two or more layers. By giving the core a multilayer structure, the spin rate on shots with a driver can be reduced, enabling a further increase in the distance traveled by the ball to be achieved. In addition, the spin characteristics and feel at the time of impact may be further improved. In such a case, the core has at least an inner core layer (center sphere) and an outer core layer.

The golf ball of the invention has one or more intermediate layer encasing the above core, and a cover encasing the intermediate layer. The materials which form the intermediate layer and the cover are described in detail below.

The material which forms the above intermediate layer includes as the base resins: (a) a nonionic olefin-unsaturated carboxylic acid copolymer and/or olefin-unsaturated carboxylic acid-unsaturated carboxylic acid ester copolymer having a weight-average molecular weight (Mw) of from 40,000 to 200,000, a weight-average molecular weight (Mw)/number-average molecular weight (Mn) ratio of from 2.0 to 10.0 and an unsaturated carboxylic acid content of at least 16 wt %, and (b) a nonionic olefin-unsaturated carboxylic acid copolymer and/or olefin-unsaturated carboxylic acid-unsaturated carboxylic acid ester copolymer having a weight-average molecular weight (Mw) of from 40,000 to 200,000, a weight-average molecular weight (Mw)/number-average molecular weight (Mn) ratio of from 4.0 to 10.0 and an unsaturated carboxylic acid content of less than 16 wt %.

The weight-average molecular weight (Mw) of component (a) is from 40,000 to 200,000, and preferably from 40,000 to 150,000. If the weight-average molecular weight (Mw) of component (a) is too small, during preparation of the material the flowability may be too high, which tends to result in pellets of non-uniform shape. Pellets of non-uniform shape do not feed stably during use, often leading to greater non-uniformity of the material. Moreover, in terms of the golf ball, obtaining a sufficient rebound is more difficult. On the other hand, if the weight-average molecular weight is too large, the flowability becomes too low, as a result of which a good moldability may not be achieved. The weight-average molecular weight (Mw)/number-average molecular weight (Mn) ratio of component (a) is from 2.0 to 10.0, and preferably from 2.5 to 7.5. When this value falls outside of the above range, the material becomes glassy, as a result of which sufficient durability as a golf ball material may be not achieved.

The weight-average molecular weight (Mw) of component (b) is from 40,000 to 200,000, and preferably from 50,000 to 190,000. If the weight-average molecular weight (Mw) of component (b) is too small, during preparation of the material the flowability may be too high, which tends to result in pellets of non-uniform shape. Pellets of non-uniform shape do not feed stably during use, which often leads to greater non-uniformity of the material and may make the material too hard. Moreover, the golf ball often has a diminished feel and durability. On the other hand, if the weight-average molecular weight is too large, the flowability becomes too low, as a result of which a good moldability may not be achieved. The weight-average molecular weight (Mw)/number-average molecular weight (Mn) ratio of component (b) is from 4.0 to 10.0, and preferably from 4.0 to 9.5. When this value falls outside of the above range, the material becomes glassy, as a result of which sufficient durability as a golf ball material may be not achieved.

Here and below, the weight-average molecular weight (Mw) and the number-average molecular weight (Mn) are values calculated relative to polystyrene in gel permeation chromatography (GPC). A word of explanation is needed here concerning GPC molecular weight measurement. It is not possible to directly take GPC measurements for binary copolymers and ternary copolymers because these molecules are adsorbed to the GPC column owing to the unsaturated carboxylic acid groups within the molecule. Instead, the unsaturated carboxylic acid groups are generally converted to esters, following which GPC measurement is carried out and the polystyrene-equivalent average molecular weights Mw and Mn are calculated.

The olefin in above component (a) or component (b) preferably has from 2 to 6 carbons, and is most preferably ethylene. The unsaturated carboxylic acid in component (a) or component (b) is preferably acrylic acid (AA) or methacrylic acid (MAA), and more preferably methacrylic acid (MAA). From the standpoint of obtaining a suitable rebound and hardness, the unsaturated carboxylic acid ester in component (a) or component (b) is preferably an alkyl ester, and more preferably a lower alkyl ester having from 1 to 8 carbons. The use of butyl acrylate (n-butyl acrylate, i-butyl acrylate) is most preferred.

The unsaturated carboxylic acid content (acid content) in component (a) is at least 16 wt %, preferably from 16 to 23 wt %, and more preferably from 16 to 22 wt %. If the acid content of component (a) is too low, it may not be possible to achieve a sufficient rebound.

The unsaturated carboxylic acid content (acid content) in component (b) is less than 16 wt %, and preferably from 7 to 15 wt %. If the acid content of component (b) is too high, the durability may worsen.

In the invention, it is essential to use component (a) and component (b) together. In this case, the mixing ratio by weight of component (a) and component (b), or (a):(b), although not subject to any particular limitation, may be set to from 20:80 to 80:20, and preferably from 30:70 to 70:30. If the proportion of component (a) is smaller than the above range, a sufficient ball rebound may not be achievable. On the other hand, if the proportion of component (a) is higher than the above range, the ball durability may worsen.

Commercial products may be used as above component (a) and component (b). For example, use may be made of products from the Nucrel series (produced by DuPont-Mitsui Polychemicals Co., Ltd.) or the Escor series (produced by ExxonMobil Chemical).

The organic acid or a metal salt thereof serving as component (c), while not subject to any particular limitation, is preferably one or more selected from the group consisting of stearic acid, behenic acid, oleic acid, maleic acid and metal salts thereof. One selected from the group consisting of stearic acid, oleic acid and mixtures thereof is especially preferred. The organic acid metal salt of component (c) is preferably a metallic soap. The metal salt makes use of metal ions having a valence of from 1 to 3 which are preferably selected from the group consisting of lithium, sodium, magnesium, aluminum, potassium, calcium and zinc. A metal salt of stearic acid is especially preferred. Specifically, the use of magnesium stearate, calcium stearate, zinc stearate or sodium stearate is preferred. Of these, the use of magnesium stearate is especially preferred.

Component (c) is included in an amount which, although not subject to any particular limitation, may be set to from 30 to 80 parts by weight, and preferably from 40 to 80 parts by weight, per 100 parts by weight of components (a) and (b) combined. When component (c) is included in too small an amount, it is difficult to ensure that the resin composition has sufficient flow properties. On the other hand, including too much component (c) may worsen the durability of the golf ball.

Illustrative examples of the metal ions in the basic inorganic metal compound of above component (d) include $Na^+$, $K^+$, $Li^+$, $Zn^{2+}$, $Ca^{2+}$, $Mg^{2+}$, $Cu^{2+}$ and $Co^{2+}$. Of these, $Na^+$, $Zn^{2+}$, $Ca^{2+}$, and $Mg^{2+}$ are preferred, and $Mg^{2+}$ is especially preferred. These metal salts may be introduced into the resin using, for example, formates, acetates, nitrates, carbonates, bicarbonates, oxides or hydroxides.

Component (d) is a component for neutralizing acid groups in above components (a) to (c). The amount of component (d) included may be set to an amount corresponding to at least 70 mol %, based on the acid groups in above components (a) to (c). In this case, the amount in which component (d) is included may be selected as appropriate for obtaining the desired degree of neutralization. More specifically, although this amount depends also on the degree of neutralization of components (a) and (b) that are used, in the present invention it may be set to generally from 0.5 to 10 parts by weight, and preferably from 1 to 5 parts by weight, per 100 parts by weight of components (a) and (b) combined.

The degree of neutralization of acid groups in above components (a) to (c) must be at least 70 mol %, and is preferably at least 75 mol %, and more preferably at least 80 mol %. The upper limit is preferably 120 mol % or less, more preferably 110 mol % or less, and even more preferably 100 mol % or less. If the above numerical range is not satisfied, the ball durability may be inferior and a high rebound may not be achieved. On the other hand, if the degree of neutralization is too high, a suitably soft material hardness will be difficult to achieve and the moldability during injection molding may worsen.

The combined amount of above components (a) to (d) accounts for at least about 50 wt %, preferably at least about 60 wt %, more preferably at least about 70 wt %, and most preferably at least about 90 wt %, of the overall intermediate layer-forming material.

Known thermoplastic resins may be included in the intermediate layer-forming material, insofar as the advantageous effects of the invention are attainable. Examples of such thermoplastic resins that may be used include, but are not limited to, polyolefin elastomers (including polyolefins and metallocene polyolefins), polystyrene elastomers, diene polymers, polyacrylate polymers, polyamide elastomers, polyurethane elastomers, polyester elastomers and polyacetals.

In addition, the intermediate layer-forming material may also suitably include various additives such as pigments, dispersants, antioxidants, ultraviolet absorbers and light stabilizers. When such additives are included, the amount in which they are included, although not subject to any particular limitation, may be set to an amount of at least 0.1 part by weight, and preferably at least 0.5 part by weight, per 100 parts by weight of the combined amount of components (a) to (d). The upper limit in the amount of such additives included, although not subject to any particular limitation, is typically 10 parts by weight or less, and preferably 4 parts by weight or less.

The melt index (MI) of the intermediate layer-forming material is not subject to any particular limitation. However, to provide good flow properties and moldability at the time of injection molding, it may be set to preferably at least 1.0 g/10 min, more preferably at least 2.0 g/10 min, and even more preferably at least 3.0 g/10 min. Although not subject to any particular limitation, it is recommended that the upper limit be set to preferably 20.0 g/10 min or less, more preferably 15.0 g/10 min or less, and even more preferably 10.0 g/10 min or less. The melt index (MI) is a value measured in accordance with JIS-K7210, and signifies here and below a measured value obtained at a test temperature of 190° C. and under a test load of 21.18 N (2.16 kgf).

The material hardness of the intermediate layer-forming material, from the standpoint of obtaining a suitably soft hardness, may be set to a Shore D hardness of at least 40, preferably at least 45, and more preferably at least 50. The upper limit is 60 or less. When the material hardness is too low, a good rebound cannot be obtained. When it is too high, the durability may worsen.

The method used to prepare the intermediate layer-forming material may be a known mixing method and is not subject to any particular limitation, although a method of mixture that involves the use of an extruder may be advantageously employed in the present invention. In such a case, the extruder used may be either a single-screw extruder or a twin-screw extruder, although a twin-screw extruder, which has a higher mixing effect, may be preferably used in the invention. Alternatively, use may be made of extruders in a tandem arrangement obtained by coupling together a plurality of extruders. Examples include two-stage tandem arrangements such as a single-screw extruder/twin-screw extruder or a twin-screw extruder/twin-screw extruder. These apparatuses and their ancillary equipment need not have a special configuration; the use of an existing configuration will suffice for the purpose here. When the intermediate layer-forming material is prepared using the extruder, the method used is not subject to any particular limitation, provided the configuration employed is one which charges into the same hopper above components (a) to (d) in proportions that will provide a predetermined formulation, and feeds these materials into the extruder by means of a feeder connected to the hopper. Alternatively, with regard to component (c), from the standpoint of metered feeding and to prevent the material from bridging in the hopper, a configuration may be employed wherein a hopper separate from that for the other components is provided for component (c) and this component is fed to the extruder by a separate feeder.

A known method may be used as the method of forming the intermediate layer around the core using the foregoing intermediate layer-forming material. For example, advantageous use may be made of a method in which the core is placed in a given mold for injection molding and the intermediate layer-forming material is injected around the core, or a method in which the core is enclosed by a pair of hemispherical half-cups that have been molded beforehand and molding is carried out under applied heat and pressure.

The thickness of the intermediate layer formed here, although not subject to any particular limitation, may be set to preferably at least 0.5 mm, more preferably at least 0.7 mm, and even more preferably at least 1.0 mm. The upper limit in the thickness also is not limited, but is preferably 3.5 mm or less, and more preferably 3.0 mm or less. In cases where there are two or more intermediate layers, the above thickness refers to the combined thickness of all the layers.

Next, the cover is formed of a material which includes:

(A) an ionic olefin-unsaturated carboxylic acid copolymer and/or olefin-unsaturated carboxylic acid-unsaturated carboxylic acid ester copolymer having a weight-average molecular weight (Mw) of from 40,000 to 200,000, a weight-average molecular weight (Mw)/number-average molecular weight (Mn) ratio of from 4.0 to 10.0 and an unsaturated carboxylic acid content of at least 16 wt %, and/or (B) an ionic olefin-unsaturated carboxylic acid copolymer and/or olefin-unsaturated carboxylic acid-unsaturated carboxylic acid ester copolymer having a weight-average molecular weight (Mw) of from 40,000 to 200,000, a weight-average molecular weight (Mw)/number-average molecular weight (Mn) of from 4.0 to 10.0 and an unsaturated carboxylic acid content of less than 16 wt %. These copolymers are formed by bringing an olefin, an optional ester or carboxylic acid, and other selected monomers, into contact with a transition metal containing a catalyst (and other possible catalyst ingredients).

The weight-average molecular weight (Mw) of component (A) is from 40,000 to 200,000, and preferably from 40,000 to 150,000. If the weight-average molecular weight (Mw) of component (A) is too small, during preparation of the material the flowability may be too high, which tends to result in pellets of non-uniform shape. Pellets of non-uniform shape do not feed stably during use, often leading to greater non-uniformity of the material. Moreover, in terms of the golf ball, obtaining a sufficient rebound is more difficult. On the other hand, if the weight-average molecular weight is too large, the flowability becomes too low, as a result of which a good moldability may not be achieved. The weight-average molecular weight (Mw)/number-average molecular weight (Mn) ratio of component (A) is from 4.0 to 10.0, and preferably from 4.0 to 7.5. When this value falls outside of the above range, the material becomes glassy, as a result of which sufficient durability as a golf ball material may be not achieved.

The weight-average molecular weight (Mw) of component (B) is from 40,000 to 200,000, and preferably from 50,000 to 190,000. If the weight-average molecular weight (Mw) of component (B) is too small, during preparation of the material the flowability may be too high, which tends to result in pellets of non-uniform shape. Pellets of non-uniform shape do not feed stably during use, which often leads to greater non-uniformity of the material and may make the material too hard. Moreover, the golf ball often has a diminished feel and durability. On the other hand, if the weight-average molecular weight is too large, the flowability becomes too low, as a result of which good moldability may not be achieved. The weight-average molecular weight (Mw)/number-average molecular weight (Mn) ratio of component (B) is from 4.0 to 10.0, and preferably from 4.0 to 9.5. When this value falls outside of the above range, the material becomes glassy, as a result of which sufficient durability as a golf ball material may be not achieved.

The olefin in above component (A) or component (B) preferably has from 2 to 6 carbons, and is most preferably ethylene. The unsaturated carboxylic acid in component (A) or component (B) is preferably acrylic acid (AA) or methacrylic acid (MAA), and more preferably methacrylic acid (MAA). From the standpoint of obtaining a suitable rebound and hardness, the unsaturated carboxylic acid ester in component (A) or component (B) is preferably an alkyl ester, and more preferably a lower alkyl ester having from 1 to 8 carbons. The use of butyl acrylate (n-butyl acrylate, i-butyl acrylate) is most preferred.

The unsaturated carboxylic acid content (acid content) in component (A) is at least 16 wt %, preferably from 16 to 23 wt %, and more preferably from 16 to 21 wt %. If the acid content of component (A) is too low, it may not be possible to achieve a sufficient rebound.

The unsaturated carboxylic acid content (acid content) in component (B) is less than 16 wt %, and preferably from 7 to 15 wt %. If the acid content of component (B) is too high, the durability may worsen.

In the invention, it is essential to use component (A) and component (B) together. In this case, the mixing ratio by weight of component (A) and component (B), or (A):(B), although not subject to any particular limitation, may be set to from 20:80 to 80:20, and preferably from 30:70 to 70:30. If the proportion of component (A) is smaller than the above range, a sufficient ball rebound may not be achievable. On the other hand, if the proportion of component (A) is higher than the above range, the ball durability may worsen.

Commercial products may be used as above component (A) and component (B). For example, use may be made of products from the Iotek series (produced by ExxonMobil Chemical), the Surlyn series (produced by E.I. DuPont de Nemours & Co.) or the Himilan series (produced by DuPont-Mitsui Polychemicals Co., Ltd.).

The combined amount of above components (A) and (B) accounts for at least about 50 wt %, preferably at least about 60 wt %, more preferably at least about 70 wt %, and most preferably at least about 90 wt %, of the overall cover-forming material.

Known thermoplastic resins may be included in the cover-forming material, insofar as the advantageous effects of the invention are attainable. Examples of such thermoplastic resins that may be used include, but are not limited to, polyolefin elastomers (including polyolefins and metallocene polyolefins), polystyrene elastomers, diene polymers, polyacrylate polymers, polyamide elastomers, polyurethane elastomers, polyester elastomers and polyacetals.

In addition, the cover-forming material may also suitably include various additives such as pigments, dispersants, antioxidants, ultraviolet absorbers and light stabilizers. When such additives are included, the amount in which they are included, although not subject to any particular limitation, may be set to at least 0.1 part by weight, and preferably at least 0.5 part by weight, per 100 parts by weight of the combined amount of components (A) and (B). The upper limit in the amount of such additives included, although not subject to any particular limitation, is typically 10 parts by weight or less, and preferably 4 parts by weight or less.

The material hardness of the cover-forming material, from the standpoint of such properties as durability, rebound and scuff resistance, may be set to a Shore D hardness of at least 50, and more preferably at least 55. The upper limit is 70 or less. When the material hardness is too low, the scuff resistance may worsen. When it is too high, the durability may worsen.

The method used to prepare the cover-forming material may be a known mixing method and is not subject to any particular limitation, although a method of mixture that involves the use of an extruder may be advantageously employed in the present invention. In such a case, the extruder used may be either a single-screw extruder or a twin-screw extruder, although a twin-screw extruder, which has a higher mixing effect, may be preferably used in the invention. Alternatively, use may be made of extruders in a tandem arrangement obtained by coupling together a plurality of extruders. Examples include two-stage tandem arrangements such as a single-screw extruder/twin-screw extruder or twin-screw extruder/twin-screw extruder. These apparatuses and their ancillary equipment need not have a special configuration; the use of an existing configuration will suffice for the purpose here.

A known method may be used as the method of forming the cover around the intermediate layer using the foregoing cover-forming material. For example, advantageous use may be made of a method in which a sphere obtained by forming an intermediate layer over a core is placed in a given mold for injection molding and the cover-forming material is injected around the sphere, or a method in which the above sphere is enclosed by a pair of hemispherical half-cups that have been molded beforehand and molding is carried out under applied heat and pressure.

The thickness of the cover formed here, although not subject to any particular limitation, may be set to preferably at least 0.5 mm, more preferably at least 0.7 mm, and even more preferably at least 1.0 mm. The upper limit in the thickness also is not limited, but is preferably 3.0 mm or less, and more preferably 2.5 mm or less.

In the golf ball of the invention, by combining an intermediate layer formed of the above intermediate layer-forming material with a cover formed of the above cover-forming material, the energy loss between materials can be reduced, thereby making it possible to impart an excellent rebound and durability.

In the golf ball of the invention, although not subject to any particular limitation, to further improve aerodynamic properties, a plurality of dimples may be formed on the cover surface in the same way as on conventional golf balls. By optimizing such dimple parameters as the number of dimple types and the total number of dimples, the golf ball can be conferred with a more stable trajectory and an excellent distance performance. Moreover, to enhance the design properties and durability of the golf ball, various treatment such as surface treatment, stamping and painting may be optionally carried out on the cover.

Golf balls which use the respective above materials have a hardness, expressed as the ball deflection (mm) when subjected to a final load of 1,275 N (130 kgf) from an initial load of 98 N (10 kgf), which, although not subject to any particular limitation, is preferably at least 3.0 mm, and more preferably at least 3.1 mm. The upper limit, although not subject to any particular limitation, is preferably 4.0 mm or less, and more preferably 3.5 mm or less.

As described above, the golf ball of the invention, by combining an intermediate layer formed of a highly neutralized resin mixture obtained by using two nonionic resins of differing weight-average molecular weights and breadths of molecular weight distribution (weight-average molecular weight/number-average molecular weight) as the base resin and adding thereto an organic acid or a metal salt thereof and a basic inorganic metal compound capable of being neutralized with a cover formed of an ionic resin having a weight-average molecular weight in a specific range and a breadth of molecular weight distribution (weight-average molecular weight/number-average molecular weight) in a specific range, is endowed with an excellent rebound and durability.

EXAMPLES

The following Examples and Comparative Examples are provided by way of illustration and not by way of limitation.

Examples 1 to 5, Comparative Examples 1 to 6

A rubber composition of the following formulation was prepared, then molded and vulcanized at 155° C. for 20 minutes, thereby producing solid cores having a diameter of 37.5 mm.

Core Formulation

| | |
|---|---|
| cis-1,4-Polybutadiene | 100 parts by weight |
| Zinc oxide | 5.0 parts by weight |
| Barium sulfate | 26.0 parts by weight |
| Antioxidant | 0.1 part by weight |
| Zinc acrylate | 23.0 parts by weight |
| Crosslinking agent (organic peroxide) | 1.2 parts by weight |

Next, the intermediate layer-forming material shown in Table 1 was injection-molded over the core so as to cover the core, thereby obtaining an intermediate layer-covered sphere having a diameter of 40.2 mm. The cover-forming material shown in Table 1 was then injection-molded over the sphere so as to cover the sphere, thereby giving a three-piece solid golf ball having a diameter of 42.7 mm. Although not described in detail herein, a plurality of dimples were formed in the same configuration on the surfaces of all the balls produced in the examples of the invention and the comparative examples, and the surfaces of the balls were clear-coated with a known urethane paint. Also, the intermediate layer-forming materials were prepared by feeding the respective starting materials shown in Table 1 (units shown are in parts by weight) to a kneading-type twin-screw extruder, and kneading under ordinary conditions. The materials thus obtained were in the form of pellets having a length of 3 mm and a diameter of 1 to 2 mm.

The properties of the golf balls obtained in the respective examples of the invention and the comparative examples were evaluated as described below. The results are shown in Table 1.

TABLE 1

|  |  | Example | | | | | Comparative Example | | | | | |
|---|---|---|---|---|---|---|---|---|---|---|---|---|
|  |  | 1 | 2 | 3 | 4 | 5 | 1 | 2 | 3 | 4 | 5 | 6 |
| Intermediate layer material formulation | MAA-based nonionic resin (1) | 50 | 70 | 50 | — | 50 | 100 | — | — | — | 100 | 50 |
|  | MAA-based nonionic resin (2) | 50 | 30 | — | 20 | 50 | — | 100 | 40 | — | — | 50 |
|  | MAA-based nonionic resin (3) | — | — | 50 | — | — | — | — | — | — | — | — |
|  | AA-based nonionic resin (4) | — | — | — | 80 | — | — | — | — | 100 | — | — |
|  | MAA-based ionic resin (5) | — | — | — | — | — | — | — | 60 | — | — | — |
|  | Magnesium stearate | 70 | 70 | 70 | 70 | 70 | 70 | 70 | 70 | 70 | 70 | 70 |
|  | Magnesium oxide | 2.0 | 1.5 | 2.0 | 1.8 | 2.0 | 1.0 | 3.0 | 1.5 | 2.1 | 1.0 | 2.0 |
| Intermediate layer material properties | Melt index (g/10 min) | 3.0 | 2.5 | 8.9 | 1.9 | 3.0 | 2.5 | 4.1 | 3.0 | 1.4 | 2.5 | 3.0 |
|  | Degree of neutralization (%) | 80 | 80 | 80 | 80 | 80 | 90 | 80 | 80 | 80 | 90 | 80 |
|  | Material hardness (Shore D) | 57 | 54 | 56 | 60 | 57 | 53 | 62 | 50 | 63 | 53 | 57 |
| Cover material formulation | MAA-based ionic resin (6) | 50 | 50 | 50 | 50 | — | 50 | 50 | 50 | 50 | — | 50 |
|  | MAA-based ionic resin (7) | 50 | 50 | 50 | 50 | 100 | 50 | 50 | 50 | 50 | 100 | — |
|  | MAA-based nonionic resin (8) | — | — | — | — | — | — | — | — | — | — | 50 |
| Cover material properties | Melt index (g/10 min) | 2.5 | 2.5 | 2.5 | 2.5 | 4.4 | 2.5 | 2.5 | 2.5 | 2.5 | 4.4 | 14.4 |
|  | Material hardness (Shore D) | 64 | 64 | 64 | 64 | 61 | 64 | 64 | 64 | 64 | 61 | 56 |
| Ball properties | Diameter (mm) | 42.70 | 42.68 | 42.67 | 42.67 | 42.71 | 42.68 | 42.67 | 42.66 | 42.70 | 42.66 | 42.69 |
|  | Weight (g) | 45.53 | 45.53 | 45.52 | 45.55 | 45.54 | 45.51 | 45.53 | 45.50 | 45.54 | 45.51 | 45.51 |
|  | Deflection (mm) | 3.19 | 3.20 | 3.31 | 3.13 | 3.25 | 3.21 | 3.17 | 3.48 | 3.01 | 3.22 | 3.66 |
|  | Initial velocity (m/s) | 77.22 | 77.20 | 77.19 | 77.27 | 77.20 | 77.07 | 77.27 | 77.10 | 77.23 | 77.14 | 76.96 |
|  | Durability | good | good | good | good | good | good | NG | good | NG | good | good |
|  | Scuff resistance | good | good | good | good | good | good | good | fair | fair | good | NG |

Ingredient amounts shown above are in parts by weight.
The materials in the above table are explained below.

MAA-Based Nonionic Resin (1)
An ethylene-methacrylic acid-isobutylene acrylate ternary copolymer available from DuPont-Mitsui Polychemicals Co., Ltd. under the trade name Nucrel N035C. Acid content, 10 wt %; Mw, 155,000; Mw/Mn, 5.76.

MAA-Based Nonionic Resin (2)
An ethylene-methacrylic acid binary copolymer available from DuPont-Mitsui Polychemicals Co., Ltd. under the trade name Nucrel N2060. Acid content, 20 wt %; Mw, 73,400; Mw/Mn, 3.12.

MAA-Based Nonionic Resin (3)
An ethylene-methacrylic acid binary copolymer available from DuPont-Mitsui Polychemicals Co., Ltd. under the trade name Nucrel N2030H. Acid content, 20 wt %; Mw, 49,500; Mw/Mn, 4.83.

AA-Based Nonionic Resin (4)
An ethylene-acrylic acid binary copolymer available from DuPont-Mitsui Polychemicals Co., Ltd. under the trade name Nucrel AN4221C. Acid content, 12 wt %; Mw, 181,000; Mw/Mn, 6.99.

MAA-Based Ionic Resin (5)
A magnesium ionomer of an ethylene-methacrylic acid-isobutylene acrylate ternary copolymer available from E.I. DuPont de Nemours & Co. under the trade name Surlyn 6320. Acid content, 9.6 wt %; Mw, 181,000; Mw/Mn, 4.98.

MAA-Based Ionic Resin (6)
A sodium ionomer of an ethylene-methacrylic acid binary copolymer available from DuPont-Mitsui Polychemicals Co., Ltd. under the trade name Himilan AM7318. Acid content, 18 wt %; Mw, 104,000; Mw/Mn, 4.65.

MAA-Based Ionic Resin (7)
A zinc ionomer of an ethylene-methacrylic acid binary copolymer available from DuPont-Mitsui Polychemicals Co., Ltd. under the trade name Himilan AM7329. Acid content, 15 wt %; Mw, 85,900; Mw/Mn, 4.86.

MAA-Based Nonionic Resin (8)
An ethylene-methacrylic acid binary copolymer available from DuPont-Mitsui Polychemicals Co., Ltd. under the trade name Nucrel N1035. Acid content, 10.5 wt %; Mw, 168,000; Mw/Mn, 6.39.

The molecular weights and molecular weight distributions of each of the above polymers were determined by measurement using gel permeation chromatography (GPC), followed by calculation of the polystyrene-equivalent values.

Magnesium Stearate
Available under the trade name Magnesium Stearate G from NOF Corporation.

The physical properties of the above materials and golf balls were measured as follows.

Melt Index (g/10 min)
The measured value obtained in accordance with JIS-K 7210 at a test temperature of 190° C. and under a test load of 21.18 N (2.16 kgf).

Shore D Hardness of Material
The composition was molded into sheets having a thickness of 2 mm, three such sheets were stacked together, and the hardness was measured with a Shore D durometer.

Deflection (mm)
The golf ball was placed on a steel plate and the deflection (mm) by the ball when compressed under a final load of 1,275 N (130 kgf) from an initial load of 98 N (10 kgf) was measured. This test was carried out at 23±1° C.

Initial Velocity (m/s)

The initial velocity of the ball was measured using an initial velocity measuring apparatus of the same type as the USGA drum rotation-type initial velocity instrument approved by the R&A. The ball was held isothermally at a temperature of 23±1° C. for at least 3 hours, then tested at the same temperature. The ball was hit using a 250-pound (113.4 kg) head (striking mass) at an impact velocity of 143.8 ft/s (43.83 m/s). Ten balls were each hit twice. The time taken by the ball to traverse a distance of 6.28 ft (1.91 m) was measured and used to compute the initial velocity of the ball. This cycle was carried out over a period of about 15 minutes.

Durability on Repeated Impact

The durability of the golf ball was evaluated using an ADC Ball COR Durability Tester produced by Automated Design Corporation (U.S.). The ball was fired pneumatically and made to repeatedly strike two metal plates arranged in parallel. Using the average number of shots required for the ball to crack, the durability was rated according to the criteria indicated below. (Average values were obtained by furnishing four balls of the same type for testing, repeatedly firing each of the four balls until it cracked, and averaging the number of shots required for the respective balls to crack. The type of tester used was a vertical COR durability tester, and the incident velocity of the balls on the metal plates was 43 m/s.)

Good: More than 150 shots
Fair: 100 to 150 shots
NG: Less than 100 shots

Scuff Resistance

A non-plated pitching sand wedge was set in a swing robot, and the ball was hit once at a head speed of 40 m/s, following which the surface state of the ball was visually examined and rated as follows.

Good: Scuff marks were inconspicuous
Fair: Paint peeling was conspicuous
NG: Burrs were conspicuous As is apparent from the results in Table 1 above, the golf balls obtained in Comparative Examples 1 to 6 had the following drawbacks.

In Comparative Example 1, a nonionic resin having an acid content of less than 16 wt % was used alone as the base resin of the intermediate layer-forming material. Compared with Examples 1, 2 and 3 of the invention, the ball hardness (deflection) softened and the durability was good, but the rebound (initial velocity) decreased.

In Comparative Example 2, a nonionic resin having an acid content of at least 16 wt % was used alone as the base resin of the intermediate layer-forming material. Compared with Examples 1, 2 and 3 of the invention, the ball rebound increased, but the material hardness was high and the durability decreased.

In Comparative Example 3, a golf ball in which a nonionic resin having an acid content of at least 16 wt % and an ionic resin having an acid content of less than 16 wt % were used in combination as the base resin of the intermediate layer-forming material. Compared with Examples 1, 2 and 3 of the invention, the ball hardness softened, but the rebound decreased.

In Comparative Example 4, a nonionic acrylic acid-based resin having an acid content of less than 16 wt % was used alone as the base resin of the intermediate layer-forming material. Compared with Example 4 of the invention, the material hardness was high and the durability of the ball decreased.

In Comparative Example 5, a nonionic resin having an acid content of less than 16 wt % was used alone as the base resin of the intermediate layer-forming material, and an ionic resin having an acid content of less than 16 wt % was used alone as the base resin of the cover-forming material. Compared with Examples 1, 2, and 3 of the invention, the ball rebound decreased.

In Comparative Example 6, an ionic resin and a nonionic resin were used together as the base resin of the cover-forming material. Compared with Example 1 of the invention, the ball had a decreased rebound, in addition to which the ball surface had a poor scuff resistance.

The invention claimed is:

1. A golf ball comprising a core, one or more intermediate layer and an outermost cover layer, wherein at least one intermediate layer is formed of a resin composition which is comprised of:
  (a) a nonionic olefin-unsaturated carboxylic acid copolymer having a weight-average molecular weight (Mw) of from 40,000 to 73,400, a weight-average molecular weight (Mw)/number-average molecular weight (Mn) ratio of from 2.0 to 10.0 and an unsaturated carboxylic acid content of at least 16 wt %,
  (b) a nonionic olefin-unsaturated carboxylic acid copolymer and/or olefin-unsaturated carboxylic acid-unsaturated carboxylic acid ester copolymer having a weight-average molecular weight (Mw) of from 40,000 to 200,000, a weight-average molecular weight (Mw)/number-average molecular weight (Mn) ratio of from 4.0 to 10.0 and an unsaturated carboxylic acid content of less than 16 wt %,
  (c) an organic acid or a metal salt thereof, and
  (d) a basic inorganic metal compound for neutralizing at least 70 mol % of acid groups in components (a) to (c), and which has a material hardness, expressed as the Shore D hardness, of from 40 to 60; and wherein the cover is formed of an ionic resin composition which is comprised of:
  (A) an ionic olefin-unsaturated carboxylic acid copolymer having a weight-average molecular weight (Mw) of from 40,000 to 150,000, a weight-average molecular weight (Mw)/number-average molecular weight (Mn) ratio of from 4.0 to 10.0 and an unsaturated carboxylic acid content of at least 16 wt %, and/or
  (B) an ionic olefin-unsaturated carboxylic acid copolymer and/or olefin-unsaturated carboxylic acid-unsaturated carboxylic acid ester copolymer having a weight-average molecular weight (Mw) of from 40,000 to 200,000, a weight-average molecular weight (Mw)/number-average molecular weight (Mn) of from 4.0 to 10.0 and an unsaturated carboxylic acid content of less than 16 wt %, and which has a material hardness, expressed as the Shore D hardness, of at least 55, wherein the cover comprises component (B).

2. The golf ball of claim 1, wherein components (a) and (b) have a mixing ratio by weight (a):(b) therebetween of from 20:80 to 80:20, component (c) is included in an amount of from 30 to 80 parts by weight per 100 parts by weight of components (a) and (b) combined, and components (A) and (B) have a mixing ratio by weight (A):(B) therebetween of from 20:80 to 80:20.

3. The golf ball of claim 1, wherein (c) is stearic acid or a metal salt thereof.

4. The golf ball of claim 1, wherein the unsaturated carboxylic acid included in components (a), (b), (A) and (B) is acrylic acid or methacrylic acid.

5. The golf ball of claim 4, wherein the unsaturated carboxylic acid ester in component (b) is a lower alkyl ester having from 1 to 8 carbons.

6. The golf ball of claim 5, wherein the unsaturated carboxylic acid ester in component (b) is butyl acrylate.

7. The golf ball of claim 1, wherein the cover-forming material includes a thermoplastic resin selected from the group consisting of polyolefin elastomers, polystyrene elastomers, diene polymers, polyacrylate polymers, polyamide elastomers, polyurethane elastomers, polyester elastomers and polyacetals.

8. The golf ball of claim 1, wherein the intermediate layer has a thickness of from 0.5 to 3.5 mm.

9. The golf ball of claim 1, wherein the cover has a thickness of from 0.5 to 3.0 mm.

* * * * *